(12) United States Patent
Tsuchiya

(10) Patent No.: US 7,076,176 B2
(45) Date of Patent: Jul. 11, 2006

(54) OPTICAL SIGNAL RECEIVER AND OPTICAL SPACE TRANSMISSION SYSTEM

(75) Inventor: Nobuo Tsuchiya, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 09/839,140

(22) Filed: Apr. 23, 2001

(65) Prior Publication Data

US 2002/0021475 A1 Feb. 21, 2002

(30) Foreign Application Priority Data

Apr. 28, 2000 (JP) .................................. 2000-130753

(51) Int. Cl.
*H04B 10/08* (2006.01)
*H04B 10/06* (2006.01)

(52) U.S. Cl. ............................ 398/202; 398/24
(58) Field of Classification Search ............ 398/119, 398/128, 130, 151, 162, 163, 202, 208, 209, 398/24; 375/351; 455/218, 229
See application file for complete search history.

(56) References Cited

U.S. PATENT DOCUMENTS

| | | | | |
|---|---|---|---|---|
| 4,677,644 A | | 6/1987 | Lacroix et al. ............. | 375/216 |
| 4,718,115 A | * | 1/1988 | Inoue ........................ | 455/218 |
| 5,099,349 A | | 3/1992 | Yoshida et al. ............. | 398/20 |
| 5,130,837 A | | 7/1992 | Kitamura et al. ........... | 398/37 |
| 5,436,750 A | | 7/1995 | Kawano ...................... | 398/10 |
| 5,479,288 A | * | 12/1995 | Ishizuka et al. ............ | 398/164 |
| 5,610,748 A | * | 3/1997 | Sakanaka et al. ........... | 398/130 |
| 5,815,298 A | * | 9/1998 | Cern ........................... | 398/16 |
| 5,920,414 A | * | 7/1999 | Miyachi et al. ............. | 398/14 |
| 6,285,481 B1 | * | 9/2001 | Palmer ....................... | 398/119 |

* cited by examiner

*Primary Examiner*—Leslie Pascal
*Assistant Examiner*—Dalzid Singh
(74) *Attorney, Agent, or Firm*—Fitzpatrick, Cella, Harper & Scinto

(57) ABSTRACT

An optical signal receiver comprising an opto-electric converter for converting an optical signal transmitted from a remotely opposed transmitter into an electric signal, a reproduction circuit for reproducing a data signal from an output of the opto-electric converter, a fixed signal generation circuit for generating a fixed signal having a logic level fixed to 0 or 1, a switch for selectively outputting either the data signal reproduced by the reproduction circuit or the fixed signal generated by the fixed signal generation circuit, and a control circuit for detecting an abnormal state of optical signal transmission and controlling the switch. The control circuit is adapted to output the fixed signal from the switch, when it detects the abnormal state while outputting the data signal from the switch. The optical signal receiver constitutes an optical space transmission system with transmitter for transmitting an optical signal.

11 Claims, 1 Drawing Sheet

OPTICAL SIGNAL RECEIVER AND OPTICAL SPACE TRANSMISSION SYSTEM

BACKGROUND OF THE INVENTION

1. Field of the Invention

This invention relates to an optical signal receiver for detecting optical signals transmitted from a remotely opposed transmitter and also to an optical space transmission system comprising such a receiver and adapted to convey information to it.

2. Related Background Art

With a conventional optical space transmission system, a signal to be transmitted from a transmitter is modulated into an optical signal, which is then transmitted from the transmitter to a receiver by way of the atmosphere. Upon receiving the signal, the receiver demodulates the optical signal transmitted from the transmitter so that the information that the signal represents can be conveyed from the transmitter to the receiver by way of the atmosphere.

However, an optical space transmission system using a light beam as an optical signal has a disadvantage that the optical signal can be affected and attenuated by natural phenomena such as rain falls and fogs in the atmosphere. As means for coping with this problem, it is a common practice to detect the DC component level of the light beam received by the receiver in order to judge if the optical signal receiver is operating properly to receive the optical signal transmitted from the remote transmitter or not.

When abnormal communications arise in such a conventional space transmission system due to a natural phenomenon such as a rain fall or a dense fog in the atmosphere operating as transmission paths of light beams, some of the optical receivers of the system may be forced to keep on outputting incorrect signals as long as the natural phenomenon continues. Then, as a result, the computer network devices receiving the output signals from such optical receivers can go down such that the devices may have to be initialized in order to restart their operations. Then, even if the optical space communication is returned to normal during the initialization, the device cannot resume its operation at least during the initialization period.

Additionally, when an optical transmission system has backup routes so that some or all of the transmission paths for optical signals in an optical transmission system may be switched to respective wired transmission paths when abnormal communications arise on those transmission paths, the computer network devices connected to the switched transmission paths cannot decide to switch the transmission path on the basis of the presence or absence of a bit stream received from the optical receiver so that they are often accompanied by a problem of difficulty of switching the transmission path and an interrupted telecommunication.

SUMMARY OF THE INVENTION

In view of the above identified circumstances, an object of the present invention is to provide an optical signal receiver and an optical space transmission system that can minimize the influence of any abnormal transmission of an optical signal on the computer network devices connected to the system by suspending the output of the received signal that may be incorrect so that the proper operation of the entire transmission system can be restored quickly.

In an aspect of the invention, the above object is achieved by providing an optical signal receiver comprising:

an opto-electric converter for converting an optical signal transmitted from a remotely opposed transmitter into an electric signal;

a reproduction circuit for reproducing a data signal from an output of the opto-electric converter;

a fixed signal generation circuit for generating a fixed signal having a logic level fixed to 0 or 1;

a switch for selectively outputting either the data signal reproduced from the reproduction circuit or the fixed signal generated by the fixed signal generation circuit; and a control circuit for detecting an abnormal state of optical signal transmission and controlling the switch, the control circuit being adapted to output the fixed signal from the switch, when it detects the abnormal state while outputting the data signal from the switch.

In another aspect of the invention, there is also provided an optical space transmission system comprising:

a transmitter for transmitting an optical signal; and an optical signal receiver as defined above that is remotely opposed to the transmitter and adapted to receive the optical signal transmitted from the transmitter.

DESCRIPTION OF THE PREFERRED EMBODIMENT

Figures 1, 2:
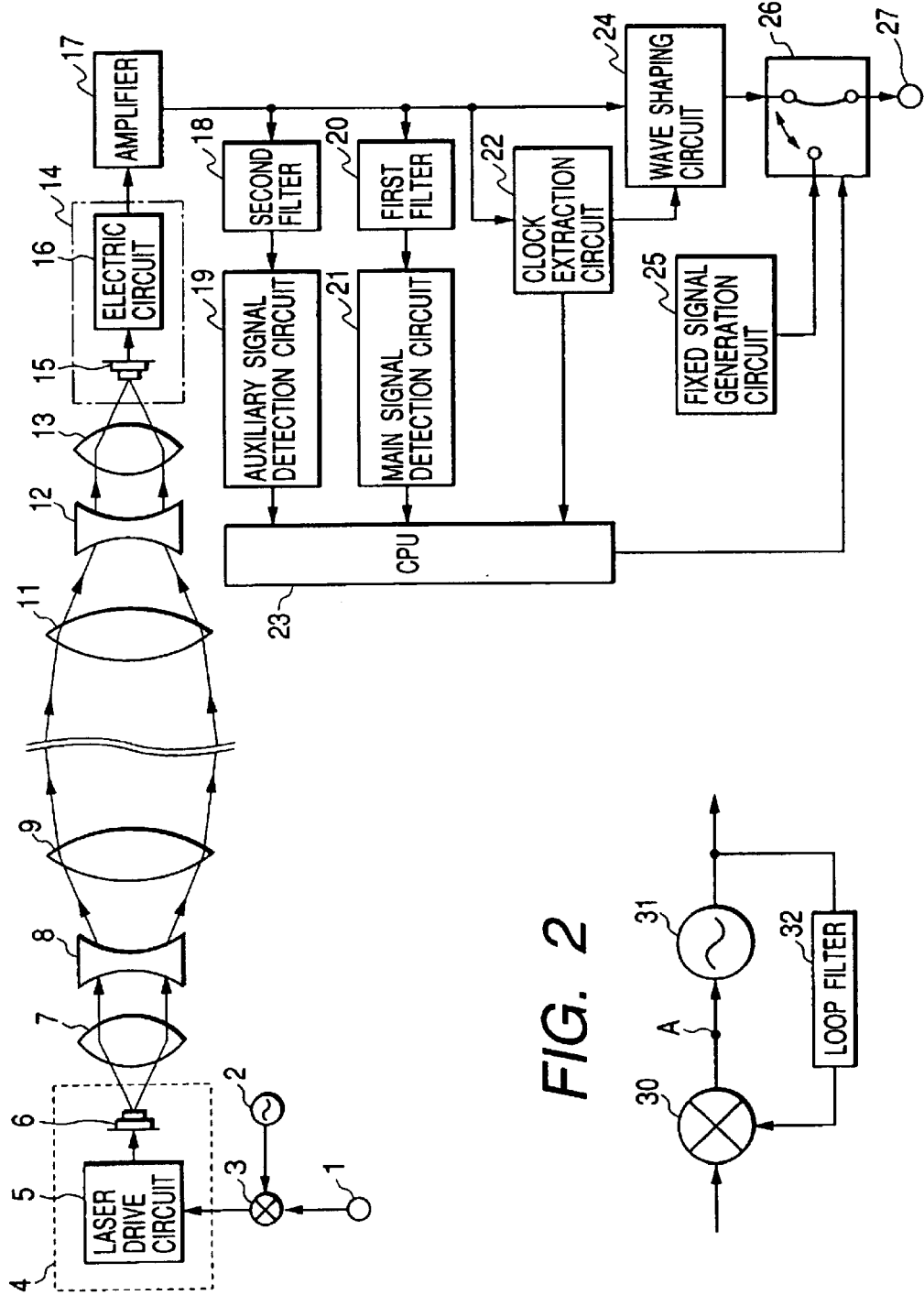
FIG. 1 is a schematic block diagram of an embodiment of optical space transmission system according to the invention.
FIG. 2 is a schematic block diagram of the clock extraction circuit of FIG. 1, illustrating a possible circuit configuration thereof.

Now, the present invention will be described in greater detail by referring to the accompanying drawings that illustrate a preferred embodiment of the invention.

FIG. 1 is a schematic block diagram of an embodiment of an optical space transmission system according to the invention. In FIG. 1, a transmitter is shown on the left and comprises a main signal input section 1 for receiving a main signal to be transmitted to a remotely opposed optical signal receiver and an auxiliary signal generation circuit 2 for generating an auxiliary signal giving an optical DC component level which is detected by the optical signal receiver. The main signal from the main signal input section 1 and the auxiliary signal generated by the auxiliary signal generation circuit 2 are inputted to a multiplexer 3 adapted to multiplex the main signal and the auxiliary signal. The electric signal produced as a result of the multiplexing operation of the multiplexer 3 is then inputted to an electro-optic converter 4 and converted into an optical signal. The electro-optic converter 4 comprises a laser drive circuit 5 and a laser diode 6 that operates as a light source. Lenses 7, 8 and 9 are sequentially arranged on the light path of the transmitter that is found in front of the laser diode 6.

On the other hand, an optical receiver is shown on the right side in FIG. 1 and comprises lenses 11, 12 and 13 sequentially arranged on the light path of the optical receiver for receiving the optical signal from the transmitter and an opto-electric converter 14 arranged on the light path behind the lens 13. The opto-electric converter 14 comprises a light receiving element 15 and an electric circuit 16, whose output terminal is connected to an amplifier 17.

The output of the amplifier 17 is connected to an auxiliary signal detection circuit 19 by way of a second filter 18 for extracting auxiliary signals and also to a main signal detection circuit 21 by way of a first filter 20 for extracting main signals.

Additionally, the output terminal of the amplifier 17 is connected to a clock extraction circuit 22 and the output terminals of the clock extraction circuit 22, the auxiliary signal detection circuit 19 and the main signal detection circuit 21 are connected to a central processing unit (CPU) 23.

Additionally, the output terminals of the amplifier 17 and the clock extraction circuit 22 are connected to a wave shaping circuit 24 and the output terminal of the wave shaping circuit 24 is connected to a switch (signal output switch) 26 adapted to selectively output either the output of the wave shaping circuit 24 or the output of a fixed signal generation circuit 25 for generating a fixed signal having a logic level fixed to 0 or 1. The output terminal of the fixed signal generation circuit 25 is also connected to the switch 26. The switching operation of the signal output switch 26 is controlled by the CPU 23 and the output terminal of the signal output switch 26 is connected to a signal output section 27.

With the above described arrangement, the main signal inputted to the main signal input section 1 of the transmitter is multiplexed with the auxiliary signal transmitted from the auxiliary signal generation circuit 2 by the multiplexer 3 and then the multiplexed signal is converted into an optical signal by the electro-optic converter 4. The optical signal is then outputted to the remotely opposed optical signal receiver by way of the lenses 7, 8 and 9.

The light beam carrying the optical signal transmitted from the transmitter is then made to pass through the lenses 11, 12 and 13 and is received by the light receiving element 15 of the opto-electric converter 14 of the optical signal receiver. The received optical signal is then converted into an electric signal by way of the electric circuit 16 and the produced electric signal is outputted to the amplifier 17.

The electric signal amplified by the amplifier 17 is then outputted to the wave shaping circuit 24 along with the clock signal extracted by the clock extraction circuit 22, which wave shaping circuit 24 then reproduces the data signal on the basis of the signal it receives and outputs the data signal to the signal output switch 26. In other words, the wave shaping circuit 24 is provided with a reproduction means for reproducing the data signal.

The electric signal amplified by the amplifier 17 is also made to pass through the auxiliary signal extraction filter 18, which extracts the auxiliary signal component and outputs it to the auxiliary signal detection circuit 19. The auxiliary signal detection circuit 19 transforms the amplitude of the inputted auxiliary signal into a voltage, which voltage is then outputted to the CPU 23. Since the auxiliary signal generated by the auxiliary signal generation circuit 2 of the transmitter is constantly held to a fixed level, the level of the received auxiliary signal rises or falls in proportion to the rise or fall of the level of the DC component of the received light beam.

Therefore, the rise or fall of the level of the DC component of the received light beam can be detected by observing the rise or fall of the level of the received auxiliary signal.

The main signal component of the electric signal amplified by the amplifier 17 is then extracted by the main signal extracting filter 20 and outputted to the main signal detection circuit 21, which main signal detection circuit 21 transforms the amplitude of the inputted main signal into a voltage and outputs the voltage to the CPU 23. Since the AC component of the light beam is the data signal component, the AC component of the received light beam is equivalent to the main signal that is the data signal transmitted from the transmitter.

The electric signal amplified by the amplifier 17 is also outputted to the clock extraction circuit 22, which clock extraction circuit 22 then extracts the clock component of the signal and sends a voltage signal to the CPU 23 to notify the latter if the signal is synchronized or not.

More specifically, the level of the DC component, that of the AC component and the information indicating the status of synchronism provided by the clock extraction circuit 22 are inputted to the CPU 23 and the CPU 23 analyses each piece of information. If the CPU 23 determines that one or more pieces of the information are found under the predetermined respective threshold levels, it causes the signal output switch 26 to be switched to output a fixed signal having a logic level fixed to 0 or 1 to the signal output section 27.

Thereafter, the CPU keeps on extracting the level of the DC component, that of the AC component and the clock component of the data signal indicating the status of synchronism and, when it determines that all the values are found above the predetermined respective threshold values, it immediately causes the signal output switch 26 to be switched to output the data signal from the wave shaping circuit 24 to the signal output section 27. Note that the threshold values to be used for determining if the level of the DC component and that of the AC component are normal or not may be made to respectively have hysteresis characteristics.

Thus, with this arrangement, the system is protected against outputting an incorrect reception signal if an abnormal communication status occurs in the optical space transmission system so that the computer network devices connected to the optical signal receiver are prevented from being adversely affected by the signal.

FIG. 2 is a schematic block diagram of the clock extraction circuit 22 of FIG. 1, illustrating a possible circuit configuration thereof. Referring to FIG. 2, the output terminal of phase comparator 30 is connected to a voltage control oscillator (VCO) 31 by way of point A and the output of the VCO 31 is fed back to the phase comparator 30 by way of a loop filter 32.

Thus, the optical signal transmitted from the remotely opposed transmitter and received by the receiver is transformed into an electric signal by the latter and then the electric signal and a clock signal outputted from the VCO 31 through the loop filter 32 are compared for their phases so that the voltage outputted from the VCO 31 is modified as a function of the relative shift of the phases of the two signals. In other words, the VCO 31 changes the frequency of the clock signal according to the change in the voltage outputted from the phase comparator 30. The voltage output from the phase comparator 30 is held to a constant level when the phase of the electric signal and that of the clock signal are made to agree with each other. Therefore, when the voltage at point A is held to a constant level, the clock component of the data signal can be extracted in a synchronized manner.

When the level of the DC component, that of the AC component and the clock component of the data signal indicating the status of synchronism are inputted to the CPU 23 and the CPU finds that an abnormal communication exists in the system, the CPU 23 causes the signal output switch 26 to be switched so that the fixed signal generation circuit 25 may output a fixed signal having a logic level fixed to 0 or 1 to the signal output section 27.

Alternatively, it may be so arranged that the switched state is maintained for a predetermined period of time, during which the CPU 23 keeps on analyzing the status of synchronism based on the level of the DC component, that of the AC component and the clock component of the data signal. When the CPU 23 determines that all the values are found above the predetermined respective threshold values and hence a state of normal communication is present at the end of the predetermined period of time, it immediately causes the signal output switch 26 to be switched to output the data signal from the wave shaping circuit 24 to the signal output section 27.

The computer network devices that are adapted to switch the transmission path to the backup route when an abnormal communication arises in the optical space transmission system are mostly so designed that they switch the respective transmission paths on the basis if there is a bit stream received from the optical signal receiver or not. Since the overall throughput of the computer network system can be lowered if such a switching operation is conducted frequently, it is normally so arranged that the operation of switching the transmission path is not realized when the period of time during which the bit stream from the optical signal receiver is absent is short.

In other words, even if an abnormal communication arises frequently in the optical space transmission system, the operation of switching the transmission path is not realized so long as such an abnormal communication continues for only a short period of time. Therefore, with the above described embodiment, a time period to be used as reference for determining that the absence of a bit stream is set long and the computer network devices should switch the respective transmission paths is provided so that an abnormal communication is determined to exist when the time period of the absence of a bit stream exceeds the reference time period. With this arrangement, the computer network devices reliably switch the respective transmission paths whenever an abnormal communication arises in the optical space transmission system.

As described above in detail, an optical signal receiver and an optical space transmission system according to the invention can minimize the influence of any abnormal transmission of an optical signal on the computer network devices connected to the system by suspending the output of the received signal that may be random and incorrect so that the proper operation of the entire transmission system can be restored quickly.

What is claimed is:

1. An optical signal receiver comprising:
   an opto-electric converter for converting an optical signal transmitted from an opposed transmitter into an electric signal;
   a reproduction circuit for reproducing a data signal from an output of said opto-electric converter;
   a fixed signal generation circuit for generating a fixed signal;
   a switch for selectively outputting either the data signal reproduced by said reproduction circuit or the fixed signal generated by said fixed signal generation circuit; and
   a control circuit for detecting an abnormal state of optical signal transmission and controlling said switch, said control circuit being adapted to output the fixed signal from said switch, when it detects the abnormal state while outputting the data signal from said switch,
   wherein the optical signal includes a main signal and an auxiliary signal giving a DC component level and said control circuit comprises means for detecting an AC component level of the optical signal, means for detecting the DC component level of the optical signal, means for comparing the detected AC component level and the detected DC component level with respective predetermined threshold values, and a clock extraction circuit for extracting a clock component from the electric signal and detecting a synchronized or unsynchronized state, said control circuit being adapted to determine that an abnormal communication state has occurred when it detects at least a state of the AC component level falling under the threshold level, a state of the DC component level falling under the threshold level and/or an unsynchronized state.

2. An optical signal receiver according to claim 1, wherein said means for detecting the AC component level of the optical signal comprises a first filter for extracting the main signal from the electric signal and a main signal detection circuit for transforming an amplitude level of the main signal extracted by the first filter into a voltage and said means for detecting the DC component level of the optical signal comprises a second filter for extracting the auxiliary signal from the electric signal and an auxiliary signal detection circuit for transforming an amplitude level of the auxiliary signal extracted by the second filter into a voltage.

3. An optical signal receiver according to claim 1, wherein said reproduction circuit comprises a wave shaping circuit for reproducing the data signal on the basis of the clock component extracted by said clock extraction circuit and the electric signal outputted from said opto-electric converter.

4. An optical signal receiver according to claim 1, wherein said clock extraction circuit comprises a phase comparator, a voltage control oscillator adapted to receive an output of the phase comparator and a feedback loop for feeding back an output of the voltage control oscillator to the phase comparator by way of a loop filter.

5. An optical signal receiver according to claim 1, wherein said control circuit causes said switch to be switched to output the data signal when the AC component level and the DC component level exceed the respective predetermined threshold values and said clock extraction circuit detects the synchronized state while said switch is outputting the fixed signal.

6. An optical signal receiver according to claim 1, wherein said control circuit causes said switch to be switched to output the data signal when the AC component level and the DC component level exceed the respective predetermined threshold values and said clock extraction circuit detects the synchronized state at the end of a predetermined period of time during which said switch keeps on outputting the fixed signal.

7. An optical signal receiver according to claim 1, further comprising:
   lenses for converging the optical signal to said opto-electric converter.

8. An optical space transmission system comprising:
   a transmitter for transmitting an optical signal; and
   an optical signal receiver according to any of claims 1 and 2 through 7, said optical signal receiver being opposed to said transmitter and adapted to receive the optical signal transmitted from said transmitter.

9. An optical space transmission system according to claim 8, wherein said transmitter comprises a main signal input section, an auxiliary signal generation circuit for generating an auxiliary signal to be used for detecting a DC component level of the optical signal, a multiplexer for multiplexing the main signal and the auxiliary signal and an electro-optic converter for converting an output of the multiplexer into an optical signal.

10. An optical space transmission system according to claim 9, wherein said transmitter further comprises lenses for sending out the optical signal transmitted from the electro-optic converter toward the optical signal receiver.

11. An optical space transmission system according to claim 9, wherein said electro-optic converter comprises a laser diode and a laser drive circuit for driving said laser diode.

* * * * *

UNITED STATES PATENT AND TRADEMARK OFFICE
CERTIFICATE OF CORRECTION

PATENT NO. : 7,076,176 B2 Page 1 of 1
APPLICATION NO. : 09/839140
DATED : July 11, 2006
INVENTOR(S) : Nobuo Tsuchiya It is certified that error appears in the above-identified patent and that said Letters Patent is hereby corrected as shown below:

<u>Column 1</u>

Line 25, "rain falls and fogs" should read --rainfall and fog--.

Line 33, "a rain fall" should read --rainfall--.

<u>Column 6</u>

Line 58, "claims 1 and" should read --claims 1 through 7,--.

Line 59, "2 through 7," should be deleted.

Signed and Sealed this

Second Day of January, 2007

JON W. DUDAS
*Director of the United States Patent and Trademark Office*